United States Patent [19]

Debois et al.

[11] 3,882,424

[45] May 6, 1975

[54] PHASE LOCKED LOOP TRANSMITTER

[75] Inventors: Pierre G. M. J. Debois, Duffel; Albert F. Liekens, Gravenwezel; Gilbert Quaghebeur, Bornem, all of Belgium

[73] Assignee: International Standard Electric Corporation, New York, N.Y.

[22] Filed: Dec. 27, 1973

[21] Appl. No.: 429,006

[30] Foreign Application Priority Data

Dec. 29, 1972 Belgium .............................. 793483

[52] U.S. Cl. .................. 332/18; 325/148; 325/177; 331/23

[51] Int. Cl. .............................................. H03c 3/08

[58] Field of Search ............ 332/16 R, 16 T, 18, 19; 325/148, 159, 177; 331/23, 25, 26; 329/122–125

[56] References Cited

UNITED STATES PATENTS

| | | | |
|---|---|---|---|
| 2,768,293 | 10/1956 | VanHofweegen | 332/19 X |
| 3,593,182 | 7/1971 | Roelofs | 331/23 |
| 3,644,831 | 2/1972 | Latker et al. | 332/16 R |
| 3,789,302 | 1/1974 | Rearwin et al. | 332/19 X |
| 3,810,046 | 5/1974 | Lance | 332/18 X |

*Primary Examiner*—Alfred L. Brody
*Attorney, Agent, or Firm*—John T. O'Halloran; Menotti J. Lombardi; Alfred C. Hill

[57] ABSTRACT

There is disclosed a phase locked loop transmitter modulated by modulating signals. This transmitter includes a controlled oscillator providing a first frequency signal, a two-input phase detector whose output is coupled to the controlled oscillator for frequency control thereof, a mixer and a source of second frequency signal. All of these transmitter components are associated with the phase locked loop and at least the phase detector and the controlled oscillator are incorporated as part of the loop. The modulating signals are coupled to the controlled oscillator through the phase detector.

8 Claims, 5 Drawing Figures

PHASE LOCKED LOOP TRANSMITTER

BACKGROUND OF THE INVENTION

The invention relates to a phase locked loop transmitter modulated by a source of signals including a two-input phase detector whose output is coupled to a first frequency source constituting a controlled oscillator, a second frequency source and a mixer, all four being associated with said loop and at least said phase detector and said controlled oscillator being part of said loop.

Such a phase locked loop transmitter is disclosed in the British Pat. No. 1,069,550. Prior to this invention, the phase locked loop was already well known in connection with other applications, particularly as a frequency demodulator or tracking filter. Indeed, a phase locked loop essentially includes a phase detector with two inputs which compares the phases between two signals. One of these is obtained from the loop and more particularly from the output of a controlled oscillator which may be a voltage-controlled oscillator (VCO) or a current-controlled oscillator (ICO) and whose frequency is governed by the output signal from the phase detector. Indeed, if there is a phase difference between the two signals at the inputs of the phase detector, after passing a low-pass loop filter at the output of the phase detector, the signal will act on suitable elements of the controlled oscillator to correct its frequency until phase coherence of the two signals at the input of the phase detector is secured. Various refinements may be introduced in such a phase locked loop such as the inclusion of mixers to change the frequencies or multipliers, for instance to create distinct frequency sources from the voltage-controlled oscillator output.

The introduction in the British Pat. No. 1,069,550 of such a concept for transmitters, particularly for wideband radio relay line of sight applications was of considerable significance since it offered the possibility of an all solid state, i.e. completely transistorized equipment which did not suffer from the limitations inherent in other types of transmitters whether these used heterodyning at a high RF (radio frequency) level using a parametric upconverter or low level mixing of an IF (intermediate frequency) signal followed by broad band power amplification at the transmitter output frequency. In the first case, the power consumption for a given transmitter output power is relatively high, there are filtering problems, difficulties of alignment, etc. As to solid state broad band power amplification, with the available transistor amplifiers, there are limitations as to the upper frequency band which may be used and the efficiency is also limited. The frequency limitations are also encountered with solutions using injection-locked oscillators.

On the other hand the phase locked loop transmitter has in principle no such frequency limitation for the output signals and it constitutes an improvement with respect to the former automatic frequency control methods due to the integration of the frequency changes by the phase comparator which produces an error voltage proportional to the phase difference instead of the frequency difference.

As disclosed in the British Pat. No. 1,069,550, the VCO may be a varactor-controlled transistor oscillator but klystrons, varactor controlled Gunn or IMPATT-diode oscillators may also be used. Such controlled oscillators may be tuned either manually or by sweeping devices until the difference frequency is within the capture range. A particularly advantageous arrangement for an automatic sweep arrangement is disclosed in the Belgian Pat. No. 793,481 entitled "Fazevergrendellus" filed on Dec. 29, 1972. Once the oscillator is captured, it will remain locked even when its frequency varies outside the capture range since any attempt on the part of the control oscillator to deviate in frequency will produce a leading or lagging phase such that through the low pass loop filter, the phase comparator will provide a sufficient voltage to produce the necessary variation in the capacitance of the varactor diode so as to bring the frequency of the controlled oscillator to that of the reference frequency feeding the phase comparator. All that is required is that the drift should remain within the locking range which is wider than the capture range.

Nevertheless, if it is desired to have a transmitter operating at a very high frequency and also if the bandwidth has to be very large to accommodate for instances a very large number of voice channels, e.g. 960, with today's components, the arrangement of the British Pat. No. 1,069,550 suffers from some limitations.

SUMMARY OF THE INVENTION

A general object of the present invention is to provide various improvements for a phase locked loop transmitter of the type disclosed in the above mentioned British patent, particularly with the aim of realizing transmitters which may operate at relatively high output frequencies such as 6 or 7 GHz (gigahertz) and which have a bandwidth adapted to the transmission of a large number of voice channels such as 960 channels or alternatively, a TV channel.

In accordance with a first characteristic of the invention, the modulating signals for said transmitter are coupled to said controlled oscillator through said phase detector.

On the other hand, in the arrangement of the British Pat. No. 1,069,550, provisions were made for a varactor diode transistor oscillator capable of being controlled from two separate inputs: one from the output of the phase detector also part of the loop, and another input for the modulating signals. In the known arrangement, there was also a quartz controlled oscillator feeding the mixer together with an output from the voltage controlled oscillator and the difference frequency produced at the output of the mixer was sent to the phase detector together with the signals from a second quartz controlled local oscillator. With the present arrangement, one may have the voltage controlled oscillator, the mixer and the phase detector all cascaded in the phase locked loop and only one local reference oscillator is necessary to provide the second input for the mixer since the input of the phase detector which is not coupled to the output of the mixer may be fed by an appropriate frequency source, e.g. 70 MHz, which is already modulated by the input signals so that no separate controlling input for the varactor diodes of the VCO are necessary.

In accordance with another feature of the invention, a phase locked loop transmitter as defined at the beginning of this specification is further characterized in that said phase locked loop includes low power means to multiply the output frequency derived from the controlled oscillator while power multipliers are coupled outside said phase locked loop to the output of said control oscillator.

Such an arrangement offers various advantages in view of the fact that present solid state devices have a limited output in the higher frequency bands such as 6 and 7 GHz whereby it may be necessary to use voltage controlled oscillators operating in lower frequency bands and to multiply their output frequency, e.g. by 4. This can be provided with the help of power multipliers included in the phase locked loop but the duplication of the multipliers offers a number of advantages. By keeping the power multipliers outside the loop, their design may concentrate on efficiency and since usually this can restrict the bandwidth possibilities, one avoids that such a restriction would unfavourably affect the design of the loop which must be capable of broad band operation. On the other hand, the low power multipliers provided inside the phase locked loop will enable to keep the same modulation index in the loop as at the final transmitter power output stage, i.e. by using the same multiplication factor both for the power multipliers outside the loop and for the broad band low power multipliers inside the loop fed from a directional coupler at the output of the VCO to provide a low signal power to the input of such multpliers. Also, this technique offers the advantage that the loop design becomes practically independent from the available transistors for the power amplifier which can be foreseen after the directional coupler at the output of the VCO in order to provide an increased power at the VCO output frequency to the power multipliers. Thus, greater power may be secured if improved transistor types become available, without affecting the design of the loop. In this manner, various power modules may be considered and the feasibility of transmitting arrangements requiring higher output power becomes independent from the power capability of the VCO.

Additionally, one may also consider the use of an harmonic mixer having such non-linear properties that it will produce the required frequency multiplication inside the phase locked loop, suitable harmonic outputs being selected at some loss of signal level in accordance with the multiplication factor which is desired both outside and inside the loop. Thus, irrespective of the output bandwidth into which one operates, the loop circuit could have the same number of elements and some loss of signal level at the output of the mixer is not significant as the essential aim is that the frequency multiplication inside the loop should maintain the correct deviation.

In accordance with a preferred embodiment of the invention, a frequency modulated RF signal is obtained by mixing in a resistive low level mixer, the transmitter local oscillator signal with a frequency modulated 70 MHz (megahertz) IF signal and the output of this mixer which remains outside the phase locked loop of the transmitter feeds a balance mixer with a 90° 3 decibel coupler acting as a phase detector which receives its second input from a low level output derived out of the output from the voltage controlled oscillator output part of the phase locked loop. The two outputs of the balanced mixer feed mixer diodes interconnected through a balancing potentiometer via respective capacitance coupling and matching networks.

With such a design, it becomes possible to secure a very wide band response for the phase locked loop, e.g. at least 2 GHz because with such a microwave phase detector which may for instance operate in the 7 GHz frequency range, the bandwidth problem which is vital for the phase locked loop is considerably eased since it is relatively much smaller due to the high frequency inputs provided through the microwave phase detector. Also, by having not only a high frequency phase detector which displays without any special problems a very large bandwidth, but by keeping the mixer fed by the local reference oscillator outside the phase locked loop, the latter may be shorter and this can facilitate its broad band design. Moreover, the high frequencies used for the microwave phase detector can be much higher than the frequency of the VCO, e.g. 4 times since this division of frequency from the output of the input mixer may be followed by a like frequency multiplication both outside the loop with the help of power multipliers and inside the loop through low power multipliers are previously explained.

BRIEF DESCIPTION OF THE DRAWINGS

The above and other objects and features of the invention as well as the best manner of attaining them will be better understood from the following description of detailed embodiments of the invention to be read in conjunction with the accompanying drawings in which.

DESCRIPTION OF THE PREFERRED EMBODIMENTS

Figure 1:
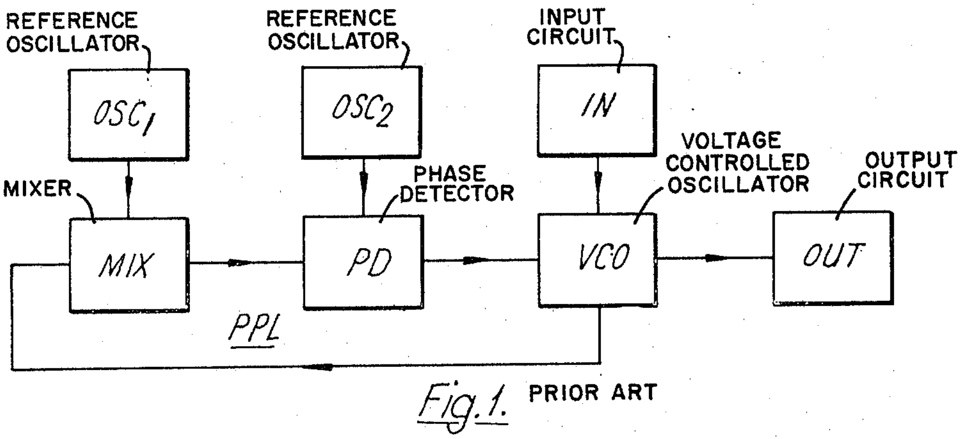
Fig.1. PRIOR ART
FIG. 1, is the block diagram of a known type of phase locked loop transmitter.

Referring to FIG. 1, there is illustrated a known arrangement of a phase locked loop transmitter in which the modulating signals provided by input circuit IN are directly applied to one input of a voltage controlled oscillator VCO inserted, through its second input and its output, in cascade with a mixer MIX and the phase detector PD in the phase locked loop PPL. The second input of the mixer MIX is fed from the output of a first reference oscillator $OSC_1$ while the second input of the phase detrector PD receives its signals from the output of a second reference oscillator $OSC_2$. The output of the voltage control oscillator VCO feeds a suitable output circuit OUT which lead to the transmitting antenna and may include a power amplifier as well as a frequency multiplier.

Figure 2:
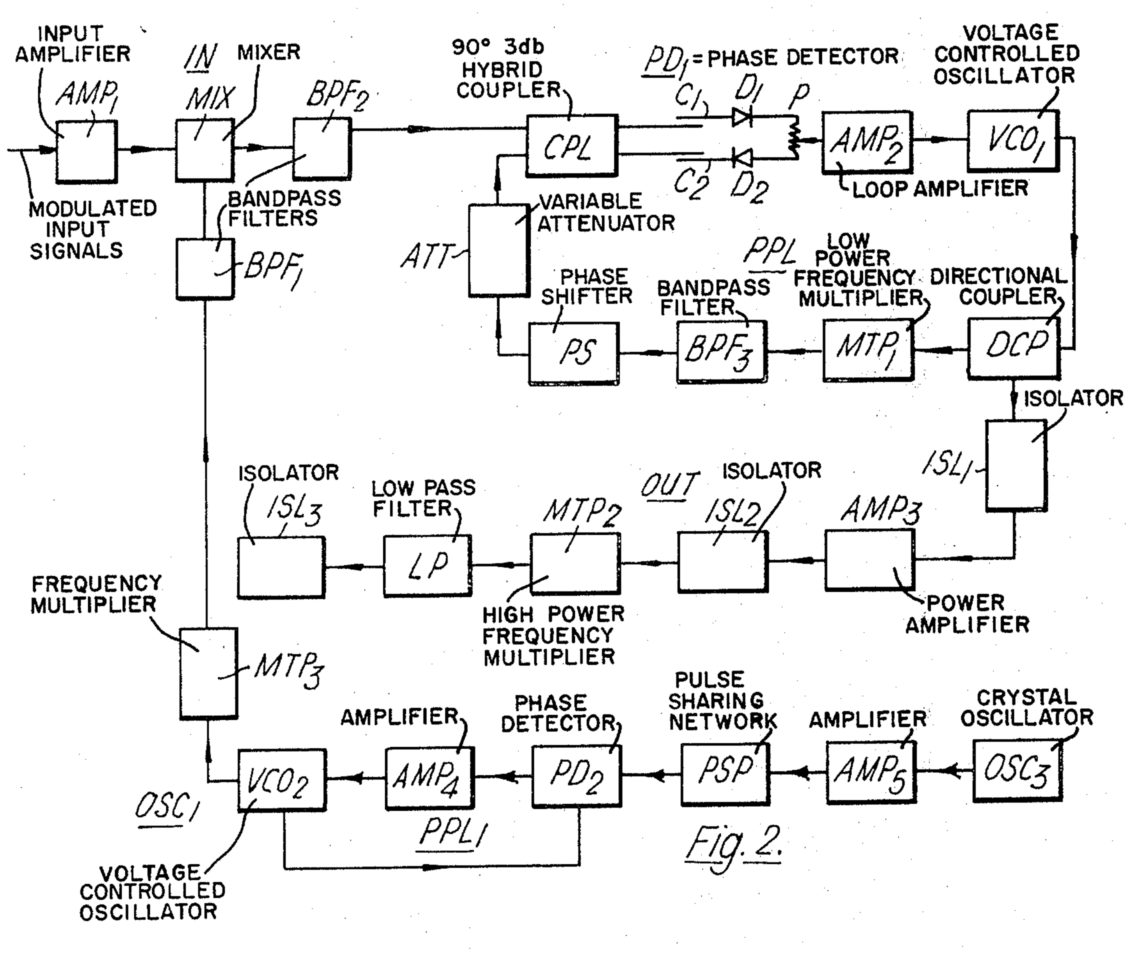
FIG. 2, is a block diagram of a preferred embodiment of this invention using a mixer outside the phase locked loop and a wide band microwave phase detector.

Referring to FIG. 2, the latter shows a phase locked loop transmitter in which the mixer MIX is now outside the loop PPL and wherein the phase detector $PD_1$ is a balanced mixer operating at the output microwave frequency of the transmitter. Thus, the mixer MIX is now part of the input circuits IN, and the rest of the circuit of FIG. 2 comprising two other main parts, i.e. the local reference oscillator $OSC_1$ feeding the mixer as the arrangement of FIG. 1, and the output circuit OUT which follow the output of the voltage controlled oscillator $VCO_1$ part of the phase locked loop PPL.

The modulated input signals which may be at 70 MHz feed the inupt amplifier $AMP_1$ and the output of the latter goes into a mixer MIX which through the bandpass filter $BPF_1$ receives a local reference frequency signal of the order of 7 GHz. Thus, the output of the mixer MIX going through the output bandpass filter $BPF_2$ is at the microwave output frequency of the order of 7 GHz and this signal constitutes one of the two inputs of the phase detector $PD_1$ part of the phase locked loop PPL. At this high frequency, a relatively large bandwidth can be secured since it represents only a few percent in terms of relative bandwidth. The two inputs to the balanced mixer type of phase detector $PD_1$ feed a 90° 3 decibel hybrid coupler CPL whose two outputs are connected to the microwave diodes $D_1$ and $D_2$ through small capacitance coupling and matching networks $C_1$ and $C_2$ respectively. Going from one output to the other, the two diodes are in the same direction and interconnected through a balancing potentiometer P whose slider output goes towards the phase locked loop amplifier $AMP_2$.

To insure the desired wideband characteristic for the phase locked loop PPL, this amplifier $AMP_2$ which has a frequency bandwidth from DC up to over 150 MHz has been realized in the form of a 2-stage direct coupled differential amplifier using lag-lead feedback networks and insuring a high common mode rejection.

Figure 3:
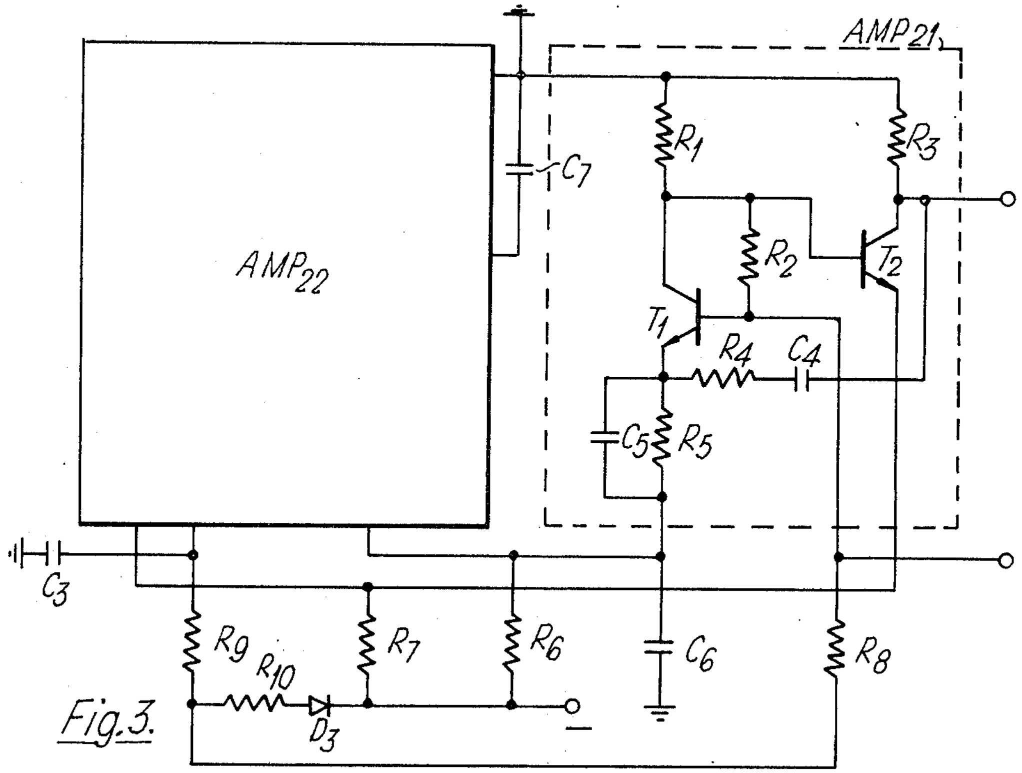
FIG. 3 is a schematic diagram of the circuit of the differential amplifier AMP2 shown in block form in FIG. 2.

This differential amplifier is represented in more detail in FIG. 3 and it is seen to include two identical stages $AMP_{21}$ and $AMP_{22}$ of which the details of the first only have been represented. The input terminal coming from the phase detector goes to the base of a first NPN transistor $T_1$ whose collector is coupled to ground potential through resistor $R_1$ and whose base is biassed via resistor $R_2$ having its other end connected to the collector. The latter is also directly coupled to the base of the output NPN transistor $T_2$ having its collector coupled to ground through resistor $R_3$. The feedback lag-lead network includes capacitor $C_4$ connected in series with resistor $R_4$ between the collector of $T_2$ and the emitter of $T_1$ which is coupled to negative bias potential via the shunt combination of resistor $R_5$ and capacitor $C_5$ in series with feed resistor $R_6$ which, as shown, is common for the two like parts $AMP_{21}$ and $AMP_{22}$ of the differential amplifier. Capacitor $C_6$ decouples $R_6$ to ground and the two inputs of the amplifier one of which, i.e. for half $AMP_{22}$, is decoupled to ground through capacitor $C_3$, are interconnected by resistors R8 and R9 whose junction point is clamped to negative potential through resistor R10 in series with diode D3. An additional capacitor $C_7$ has been provided for amplifier half $AMP_{22}$ across the collector resistor corresponding to $R_1$ in order to improve the frequency response. The commoned emitters of transistors $T_2$ are biassed to negative potential through common resistor $R_7$.

The output voltage at the collector of transistor $T_2$ feeds the voltage controlled oscillator $VCO_1$ (FIG. 2) which can be realized with a transistor working in the frequency band extending from 1,781 MHz to 1,932 MHz. Its output goes to directional coupler DCP which enables the extraction of a low power signal to be returned through the phase locked loop PPL to the other input of the hybrid coupler CPL part of the balanced mixer type of phase detector $PD_1$. This return part of the phase locked loop include a frequency multiplier $MTP_1$ using a graded junction fast recovery diode and the multiplier output goes to a bandpass filter $BPF_3$ whose output is not directly connected to the second input of the phase detector $PD_1$. First, the signal at the output of bandpass filter $BPF_3$ goes through a phase shifter PS. This is introduced in the loop to optimize the closed loop conditions and it can be tuned to give an additional 180° phase shift in the return part of the loop. Also, the latter includes a variable attenuator ATT at the output of the phase shifter PS and this can be used to adjust the output power of the multiplier $MTP_1$ to a suitable small amount of power, e.g. 1 milliwatt at the input of the phase detector $PD_1$. Such elements as phase shifters PS and variable attenuator ATT help to secure appropriate damping of reflections with respect to the phase detector and also an appropriate phase relationship.

Just as the low power multiplier $MPT_1$ inside the loop may return the output signal from $VCO_1$ back to the 7 $GH_z$ output frequency range, in the output cirucit OUT which interconnects the directional coupler DCP to the antenna branching system (not shown), a power frequency multiplier $MTP_2$ providing the same multiplication factor as $MTP_1$, e.g. 4 will provide the output modulated signals in the required output frequency range. This power frequency multiplier $MTP_2$ is preceded by a power amplifier for the $VCO_1$ output, this power amplification $AMP_3$ being inserted between two isolators $ISL_1$ and $ISL_2$ which avoid any undesired impedance effects of the multiplier $MTP_2$ on the phase locked loop PPL. Finally, the output power signals from the multiplier $MTp_2$ go towards the antenna branching system via a low pass filter LP followed by a further isolated ISL3.

The last main part of the phase locked loop transmitter of FIG. 2 is the local oscillator unit $OSC_1$ which is realized as a high frequency stability oscillator with the help of a further phase locked loop involving voltage controlled oscillator $VCO_2$ fed from the output of a further phase detector $PD_2$ through loop amplifier $AMP_4$. As for the main transmitter phase locked loop PPL, $VCO_2$ oscillates in the 2 GHz range and its frequency is brought to the desired 7 GHz range with the help of another multiplier, i.e. $MTP_3$ which again multiplies the frequency by a factor of 4.

The required frequency stability is obtained by locking the loop $PPL_1$ to a high stability crystal oscillator $OSC_3$ which can operate at around 100 MHz and to avoid interstage multipliers between the oscillator $OSC_3$ and the phase detector $PD_2$, the output from $OSC_3$ feeds the reference input of $PD_2$ through an amplifier $AMP_5$ followed by a pulse shaping network whose output can then be compared with the sample from $VCO_2$ in a strip line sampling phase detector constituting $PD_2$.

Figure 4:
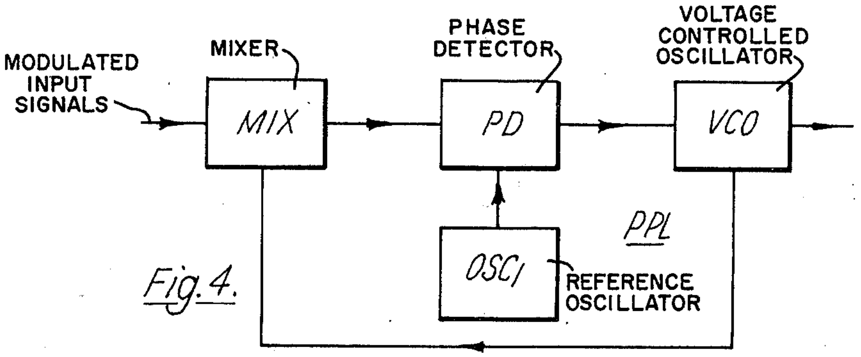
FIG. 4 is a block diagram of a modification of the arrangement of FIG. 2 with a mixer included inside the phase locked loop.

FIG. 4 shows a modification for part of the arrangement of FIG. 2. Here, while the phase detector PD is again arranged to operate at high frequency, e.g. in the 7 GHz range, being fed by a signal of like frequency from the reference oscillator $OSC_1$, its other input comes from the output of the mixer MIX which receives the modulated input signals, e.g. at 70 MHz from circuit IN at one of its two inputs, the second mixer input being coupled to the output of the VCO to receive a suitable low power output signal therefrom to complete the phase locked loop PPL. While this has the disadvantage of constituting a somewhat longer loop, this time, the output from the VCO is not directly forwarded to an input of the phase detector PD (eventually through a frequency multiplier chain) so that there is no danger that a small leak through the phase detector PD could produce direct injection locking of the VCO.

On the other hand, it may be remarked however that it has already been proposed to purposely use an injection locking arrangement in which the input signal feeds a 3-port circulator with the oscillator at the second port and the output at the third, in combination with the phase locked loop as this may lead to advantages from the point of view of loop stability.

Figure 5:
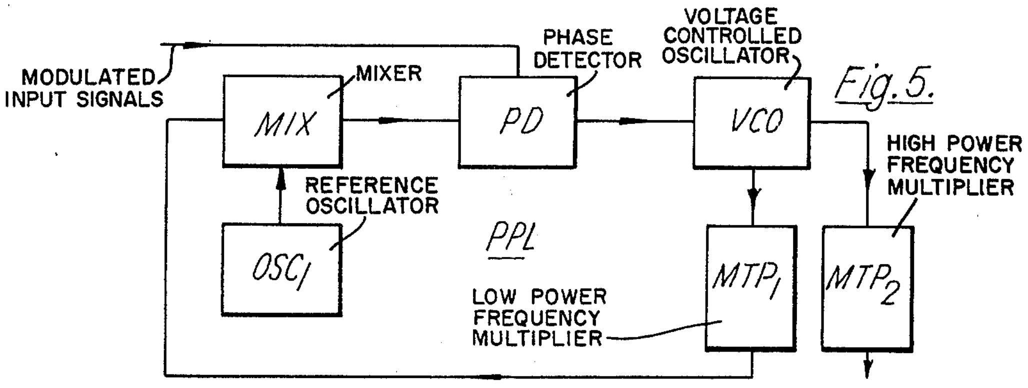
FIG. 5 is a block diagram of a modification of the arrangement of FIG. 4 with the modulated input signals directly feeding one input of the phase detector.

FIG. 5 represents yet another modification of the arrangement of FIG. 2. Again, the loop PPL includes a low power frequency multiplier $MTP_1$ giving the same multiplication factor as the output power multiplier $MTP_2$ leading towards the antenna branching system. But here, as in FIG. 4, the mixer MIX is included in the loop but instead of being fed at one input by the modulated input signals at 70 MHz, its second input is the 7 GHz reference frequency from the local reference oscillator $OSC_1$ whose exact frequency is appropriately selected with respect to the frequency at the output of multiplier $MTP_1$ so that the output frequency from mixer MIX corresponds to that of the input signals at 70 MHz feeding the phase comparator PD which now operates at relatively low frequency.

While the principles of the invention has been described above in connection with specific apparatus, it is to be clearly understood that this description is made only by way of example and not as a limitation on the scope of the invention.

We claim:

1. A phase locked loop transmitter comprising:
- a first source of modulated input signals;
- a second source of stabilized reference signals having a given frequency;
- a mixer coupled to said first and second sources;
- a phase locked loop including
  - a phase detector having two inputs, one of said two inputs of said phase detector being coupled to the output of said mixer,
  - a loop amplifier coupled to the output of said phase detector,
  - a voltage controlled oscillator having its frequency control input coupled to the output of said loop amplifier providing an output signal having a frequency equal to a submultiple of said given frequency,
  - a directional coupler coupled to the output of said controlled oscillator,
  - a low power frequency multiplier coupled to one output of said directional coupler to provide an output signal having a frequency equal to said given frequency,
  - a bandpass filter coupled to the output of said low power frequency multiplier,
  - a phase shifter coupled to the output of said bandpass filter, and
  - a variable attenuator coupled between the output of said phase shifter and the other of said two inputs of said phase detector;
- a power amplifier coupled to the other output of said directional coupler; and
- a high power frequency multiplier coupled to the output of said power amplifier to provide an output signal having said given frequency for said transmitter.

2. A transmitter according to claim 1, wherein said loop amplifier includes
- a differential amplifier.

3. A transmitter according to claim 2, wherein said phase detector includes
- a 90° 3 decibel hybrid coupler having two outputs and two inputs, one of said two inputs of said coupler being coupled to said mixer and the other of said two inputs of said coupler being coupled to said attenuator,
- a capacitance coupling and matching network coupled to each of said two outputs,
- a diode coupled to each of said networks, and
- a balancing potentiometer having a slider coupled to the input of said differential amplifier, one terminal connected to one of said diodes and the other terminal connected to the other of said diodes.

4. A transmitter according to claim 2, wherein said differential amplifier includes
- two stages, each of said two stages having
  - a first NPN transistor having a collector, an emitter and a base coupled to the output of said phase detector,
  - ground potential,
  - a first resistor coupled between said collector of said first transistor and said ground potential,
  - a second resistor coupled between said base and said collector of said first transistor,
  - a second NPN transistor having a collector, an emitter and a base coupled to said collector of said first transistor,
  - a third resistor coupled between said collector of said second transistor and said ground potential, said collector of said second transistor being coupldd to said frequency control input of said controlled oscillator,
  - a feedback network including a fourth resistor connected in series with a first capacitor, said feedback network being connected between said collector of said second transistor and said emitter of said first transistor,
  - a negative bias potential,
  - a fifth resistor coupled to said negative bias potential,
  - a second capacitor coupled in shunt relation with a sixth resistor, said second capacitor and said sixth resistor being connected between said emitter of said first transistor and said fifth resistor,
  - a seventh resistor coupled between said negative bias potential and said emitter of said second transistor,
  - an eighth resistor coupled to said base of said first transistor,
  - a third capacitor coupled to said ground potential,
  - a ninth resistor coupled between said eighth resistor and said third capacitor,
  - a clamp circuit including the series connected of a tenth resistor and a diode, said clamp circuit being coupled between said negative bias potential and the junction of said eighth and ninth resistors, and a fourth capacitor being coupled between said ground potential and the junction of said fifth resistor and the shunt combination of said second capacitor and said sixth resistor.

5. A transmitter according to claim 4, wherein said phase detector includes a 90° 3 decibel hybrid coupler having two outputs and two inputs, one of said two inputs of said coupler being coupled to said mixer and the other of said two inputs of said coupler being coupled to said attenuator, a capacitance coupling and matching network coupled to each of said two outputs, a diode coupled to each of said networks and a balancing potentiometer having a slider coupled to said base of said first transistor, one terminal connected to one of said diodes and the other terminal connected to the other of said diodes.

6. A transmitter according to claim 1, wherein said loop amplifier includes two stages, each of said two stages having a first NPN transistor having a collector, an emitter and a base coupled to the output of said phase detector, ground potential, a first resistor coupled between said collector of said first transitor and said ground potential, a second transistor coupled between said base and said collector of said first transistor, a second NPN transistor having a collector, an emitter and a base coupled to said collector of said first transistor, a third resistor coupled between said collector of said second transistor and said ground potential, said collector of said second transistor being coupled to said frequency control input of said controlled oscillator, a feedback network including a fourth resistor connected in series with a first capacitor, said feedback network being connected between said collector of said second transistor and said emitter of said first transistor, a negative bias potential, fifth resistor coupled to said negative bias potential, a second capacitor coupled in shunt relation with a sixth resistor, said second capacitor and said sixth resistor being connected between said emitter of said first transistor and said fifth resistor, a seventh resistor coupled between said negative bias potential and said emitter of said second transistor, an eighth resistor coupled to said base of said first trnasistor, a third capacitor to said ground potential, a ninth resistor coupled between said eighth resistor and said third capacitor, a clamp circuit including the series connection of a tenth resistor and a diode, said clamp circuit being coupled between said negative bias potential and the junction of said eighth and ninth resistors, and a fourth capacitor being coupled between said ground potential and the junction of said fifth resistor and the shunt combination of said second capacitor and said sixth resistor.

7. A transmitter according to claim 1, wherein said phase detector includes a 90° 3 decibel hydrid coupler having two outputs and two inputs, one of said two inputs of said coupler being coupled to said mixer and the other of said two inputs of said coupler being coupled to said attenuator, a capacitance coupling and matching network coupled to each of said two outputs, a diode coupled to each of said networks, and a balancing potentiometer having a slider coupled to said loop amplifier, one terminal connected to one of said diodes and the other terminal connected to the other of said diodes.

8. A transmitter according to claim 1, wherein said loop amplifier includes two stages, each of said two stages having a first NPN transistor having a collector, an emitter and a base coupled to the output of said phase detector, ground potential, a first resistor coupled between said collector of said first transistor and said ground potential, a second resistor coupled between said base and said collector of said first transistor, a second NPN transistor having a collector, an emitter and a base coupled to said collector of said first transistor, a third resistor coupled between said collector of said second transistor and said ground potential, said collector of said second transistor being coupled to said frequency control input of said controlled oscillator, a feedback network including a fourth resistor connected in series with a first capacitor, said feedback network being connected between said collector of said second transistor and said emitter of said first transistor, a negative bias potential, a fifth resistor coupled to said negative bias potential, a second capacitor coupled in shunt relation with a sixth resistor, said second capacitor and said sixth resistor being connected between said emitter of said first transistor and said fifth resistor, a seventh resistor coupled between said negative bias potential and said emitter of said second transistor, an eighth resistor coupled to said base of said first transistor, a third capacitor coupled to said ground potential, a ninth resistor coupled between said eighth resistor and said third capacitor, a clamp circuit including the series connection of a tenth resistor and a diode, said clamp circuit being coupled between said negative bias potential and the junction of said eighth and ninth resistors, and a fourth capacitor being coupled between said ground potential and the junction of said fifth resistor and the shunt combination of said second capacitor and said sixth resistor; and said phase detector includes a 90° 3 decibel hybrid coupler having two outputs and two inputs, one of said two inputs of said coupler being coupled to said mixer and the other of said two inputs of said coupler being coupled to said attenuator, a capacitance coupling and matching network coupled to each of said two outputs, a diode coupled to each of said networks, and a balancing potentiometer having a slider coupled to said base of said first transistor, one terminal connected to one of said diodes and the other terminal connected to the other of said diodes.

* * * * *